Patented June 28, 1932 1,865,120

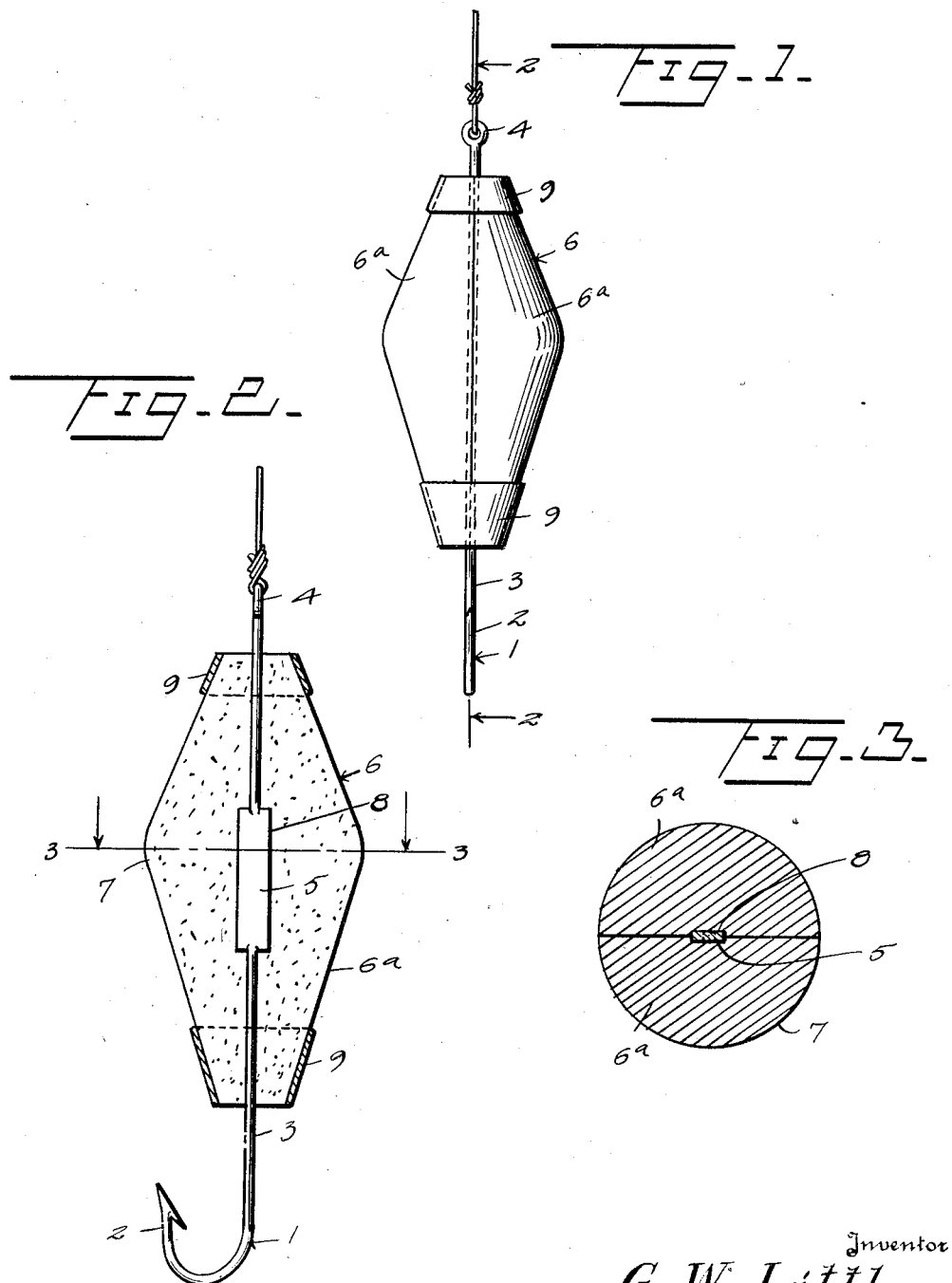

UNITED STATES PATENT OFFICE

GEORGE W. LITTLE, OF NEWPORT, RHODE ISLAND

FISHHOOK

Application filed November 1, 1930. Serial No. 492,820.

This invention relates to improvements in fishing devices and pertains particularly to an improved fish hook.

The primary object of the present invention is to provide a fish hook which will not engage in rocks, logs or other objects in the water into which it is cast, thus enabling the user to fish in waters having a rocky bottom without danger of losing the hook and possibly a large portion of the line to which it is attached.

The present improved fishing hook is designed primarily for use in fishing for fish of the larger varieties, such as tautog, black fish, blue fish or sea bass, which are caught for the most part from the shore or from fishing piers and frequent a rock bottom shore.

Another object of the invention is to provide an improved fish hook designed for the purpose above described, which is of strong and durable construction and comparatively inexpensive to manufacture.

The invention will be best understood from a consideration of the following detailed description taken in connection with the accompanying drawing forming part of this specification, with the understanding, however, that the invention is not confined to any strict conformity with the showing of the drawing but may be changed or modified so long as such changes or modifications mark no material departure from the salient features of the invention as expressed in the appended claims.

In the drawing:

Figure 1 is a view in side elevation of the improved fish hook embodying the present invention.

Figure 2 is a sectional view taken on the line 2—2 of Figure 1.

Figure 3 is a transverse sectional view taken on the line 3—3 of Figure 2.

Referring more particularly to the drawing wherein like numerals of reference indicate corresponding parts throughout the several views, the numeral 1 indicates generally the hook embodying the present invention which, as shown, has the usual turned barbed end 2 and the relatively long shank 3 which terminates at the other end in the eye 4 through which a fishing line may be engaged.

Intermediate its ends the shank 3 has secured thereto or cast integrally therewith the elongated flat plate 5 which extends longitudinally of the shank as shown.

Encasing the shank and covering the major portion thereof is an elongated body 6 which is of circular cross-section and is of greatest diameter at the point 7 which is substantially midway between its ends, the body gradually decreasing in diameter to each end as shown. This body, which may be described as being of double cone shape, is divided longitudinally to form the two portions, each of which is indicated by the numerals 6ª and each of these portions has its flat face provided with a groove 8 in which the shank 3 positions, a suitable space being provided intermediate the ends of the portions 6ª of the body to receive the elongated plate 5.

The portions 6ª of the body 6 are glued or otherwise secured together by the hook shank 3 and each end of the body has secured thereover the metal ferrules 9 which, in addition to the other means employed, serve to hold the body portions together. The plate 5 carried by the shank of the hook prevents movement of the body 6 longitudinally on the hook shank.

The diameter of the body 6 at its widest point is such that the surface at this point is substantially in alignment or in the same plane as the tip of the portion 2 of the hook. In other words, the tip of the hook is substantially the same distance from the shank as the surface of the body 6 at the widest point so that when the hook is dragged over the ground it will be prevented from coming in contact therewith at the point, by the body 6. This body may be of wood, cork or any other suitable material, the buoyant action of which will also serve to prevent the hook catching in stones upon the bed of the body of water being fished, by lifting the point away from the bottom.

It will, of course, be understood that a weight of suitable size may be attached to the line to which the hook is connected, close to the hook, so that the hook will be carried under the surface of the water as far as necessary or desired It will be noted that the body 6 is of greater length from the point of greatest diameter to the lower end thereof than from this point to the upper end. This gives the necessary diameter to the body to protect the hook point without covering the hook point to such an extent that a fish would have difficulty in taking the same into its mouth.

The lower end of the body is also provided with a ferrule of greater width than the upper end as this end would be more likely to be split because of the narrowness thereof, than would the wider upper end.

Having thus described my invention, what I claim is:

1. In a fishing hook, a hook body having an elongated shank, said shank having a portion intermediate its ends flattened, a body of circular cross section and of substantially double cone-shape configuration divided longitudinally and having the shank with the flattened portion thereof disposed between the two portions, and securing members surrounding each end of the body to retain the portions thereof together, the flattened portion of said hook preventing the turning or longitudinal movement of the shank in the body.

2. A hook of the character described, comprising a hook member having an elongated shank, a body of double cone-shape configuration having said shank extending longitudinally therethrough, the circumferential surface of said body about the widest part thereof being substantially the same distance from the shank of the hook as the tip of the hook, and acting to protect the hook tip when dragged over a surface.

In testimony whereof I hereunto affix my signature.

GEORGE W. LITTLE.